(12) United States Patent
Huang

(10) Patent No.: US 10,493,606 B2
(45) Date of Patent: Dec. 3, 2019

(54) DISASSEMBLER FOR IRON SLEEVE OF DRAG ARM

(71) Applicant: GU SIANG TOOLS DEVELOP CO., LTD., Chiayi County (TW)

(72) Inventor: Sheng-Pin Huang, Chiayi County (TW)

(73) Assignee: Gu Siang Tools Develop Co., Ltd., Chiayi County (TW)

( * ) Notice: Subject to any disclaimer, the term of this patent is extended or adjusted under 35 U.S.C. 154(b) by 304 days.

(21) Appl. No.: 15/662,758

(22) Filed: Jul. 28, 2017

(65) Prior Publication Data
US 2019/0030700 A1    Jan. 31, 2019

(51) Int. Cl.
*B23P 19/02* (2006.01)
*B25B 27/28* (2006.01)
*B25B 27/06* (2006.01)

(52) U.S. Cl.
CPC ............ *B25B 27/28* (2013.01); *B25B 27/062* (2013.01); *B60G 2204/41* (2013.01)

(58) Field of Classification Search
USPC .......................... 29/235, 255, 263, 264, 283
See application file for complete search history.

(56) References Cited

U.S. PATENT DOCUMENTS

| | | | |
|---|---|---|---|
| 3,748,718 A * | 7/1973 | Russell | B25B 27/023 29/283 |
| 6,904,660 B2 * | 6/2005 | English | B25B 27/023 285/417 |
| 7,818,850 B2 * | 10/2010 | Billarant | A44B 18/0076 24/306 |

* cited by examiner

*Primary Examiner* — Joseph J Hail
*Assistant Examiner* — Shantese L McDonald
(74) *Attorney, Agent, or Firm* — Rosenberg, Klein & Lee

(57) ABSTRACT

A disassembler for an iron sleeve of a drag arm is disclosed. It comprises a top push casing, a bolt nut, a first screw inserted into an iron sleeve of a drag arm and screwed on the top push casing and the bolt nut, a casing for accommodating a bushing, a clamping seat, two positioning elements disposed on the clamping seat for clamping the casing and the bushing and for positioning the casing on the bushing, and a second screw screwed on the casing and contacting the top push casing in the bushing.

15 Claims, 14 Drawing Sheets

DISASSEMBLER FOR IRON SLEEVE OF DRAG ARM

BACKGROUND OF THE INVENTION

1. Field of the Invention

The present invention relates to a disassembler for an iron sleeve of a drag arm which can disassemble iron sleeves from drag arms.

2. Description of Related Art

Traditional methods and disassembler structures of disassembling an iron sleeve from a bushing of a drag arm by beating the iron sleeve usually consume lots of manpower. Furthermore, if the applied pounding force is deviated from the center of the iron sleeve, the iron sleeve and the bushing are prone to deformation and damage which make the iron sleeve difficult to disassemble.

Accordingly, it is imperative to improve the traditional structures for disassembling iron sleeves from bushings of drag arms to meet the demand for effort-saving and having increased convenience.

SUMMARY OF THE INVENTION

In view of the above-mentioned problems, the object of the present invention is to provide a disassembler for an iron sleeve of a drag arm which can change a diameter of a casing for clamping a bushing according to the size of the bushing and can detach the iron sleeve from the bushing of the drag arm in a simple and gradual way so as to achieve efficacy of time-saving, effort-saving, and increased practicality and to prevent damages to the iron sleeve and the bushing of the drag arm.

Disclosed herein is a disassembler for an iron sleeve of a drag arm. It comprises a top push casing, a first screw, a bolt nut, a casing, a clamping seat, two positioning elements, and a second screw.

The top push casing has a closed end, an open end opposite to the closed end, and a first threaded hole disposed at the closed end.

The first screw has a first end for screwing into the first threaded hole and a second end opposite to the first end.

The bolt nut is screwed on the second end of the first screw inserted into an iron sleeve of a drag arm for positioning the iron sleeve between the top push casing and the bolt nut and making the iron sleeve be clamped by the top push casing and the bolt nut.

The casing has a ring surface, a second threaded hole disposed on the ring surface, an arc wall having one end extended from a partial periphery of the ring surface, a flange disposed on the other end of the arc wall for engaging with a junction of the iron sleeve and a bushing of the drag arm.

The clamping seat has two terminals for accommodating the casing.

The two positioning elements are two blocks with curvature and respectively disposed on the two terminals of the clamping seat for clamping and positioning the casing on the bushing, and each of the two positioning elements has an outer arc surface towards the clamping seat and an inner arc surface towards the bushing and the casing. The inner arc surface has a stepped shape comprising a first clamping surface relative to the bushing and a second clamping surface relative to the casing.

The second screw is inserted into the second threaded hole of the casing for screwing on the casing and is provided with a push piece for contacting an outer surface of the closed end of the top push casing.

Accordingly, when the second screw is rotated, the push piece of the second screw pushes forwards the top push casing to detach the iron sleeve inserted by the first screw and clamped by top push casing and the bolt nut from the bushing of the drag arm.

Furthermore, an inner surface of the arc wall of the casing is provided with an arc gasket for reducing an inner diameter of the arc wall of the casing. In such a case, the disassembler for an iron sleeve of a drag arm of the present invention can be applicable for disassembling various iron sleeves having different external diameters.

Compared with the technique available now, the present invention has the following advantages:

1. The use of the top push casing cooperated with the first screw, the bolt nut, the casing, the clamping seat, the two positioning elements and the second screw allows iron sleeves to detach from shaft bearings of drag arms successfully, which can prevent damages to the iron sleeves in a disassembling process.

2. The diameter of the casing can be changed according to different sizes of iron sleeves by installing an arc gasket or not. Furthermore, the first clamping surfaces and the second clamping surfaces of the two positioning elements ensure the disassembler to clamp and position the casing on the bushing so that the disassembler can successfully disassemble the iron sleeve in the bushing.

DETAILED DESCRIPTION OF THE PREFERRED EMBODIMENT

Figure 1:
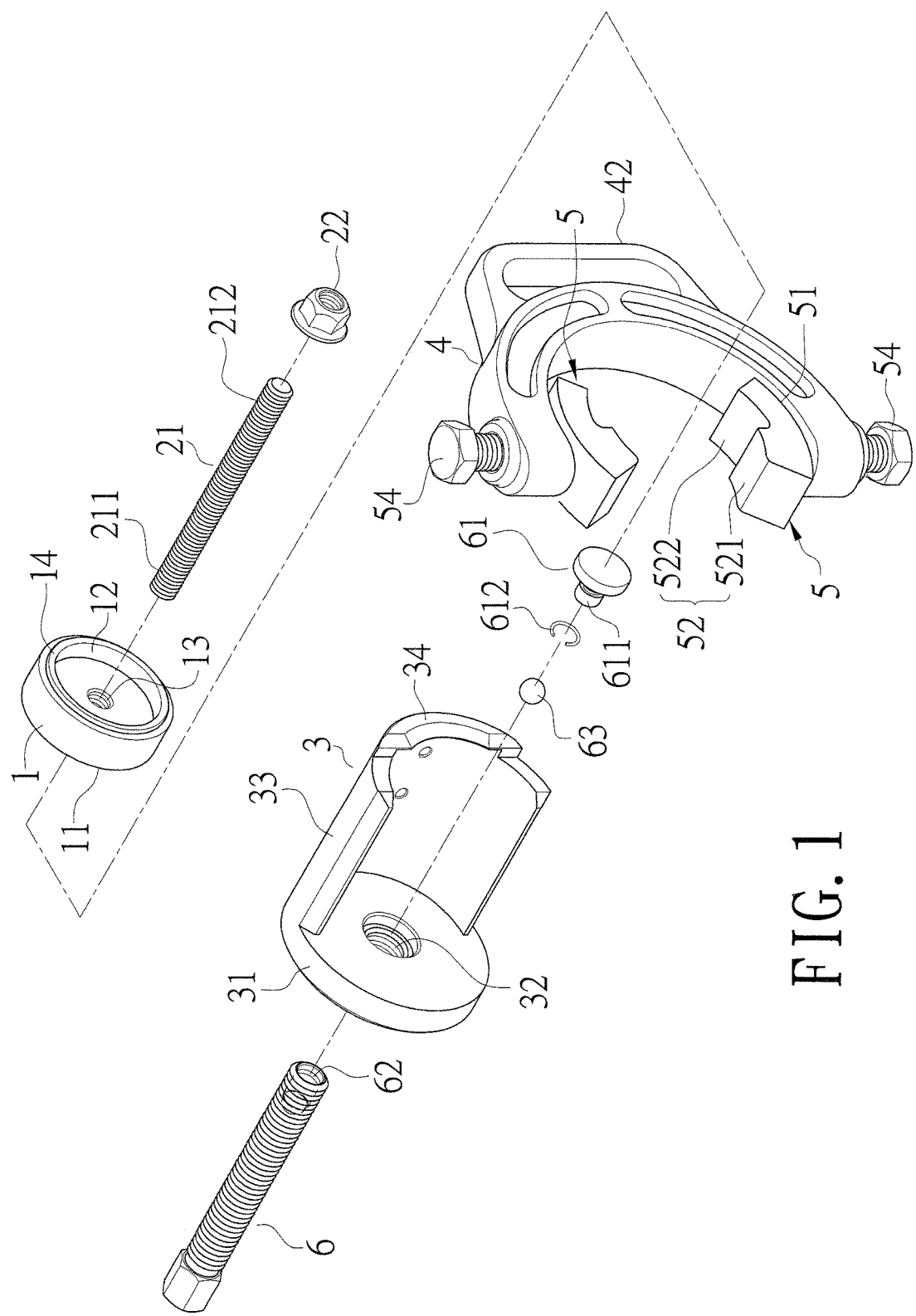
FIG. 1 is a stereogram showing a disassembler for an iron sleeve of a drag arm according to the present invention.
Figure 2:
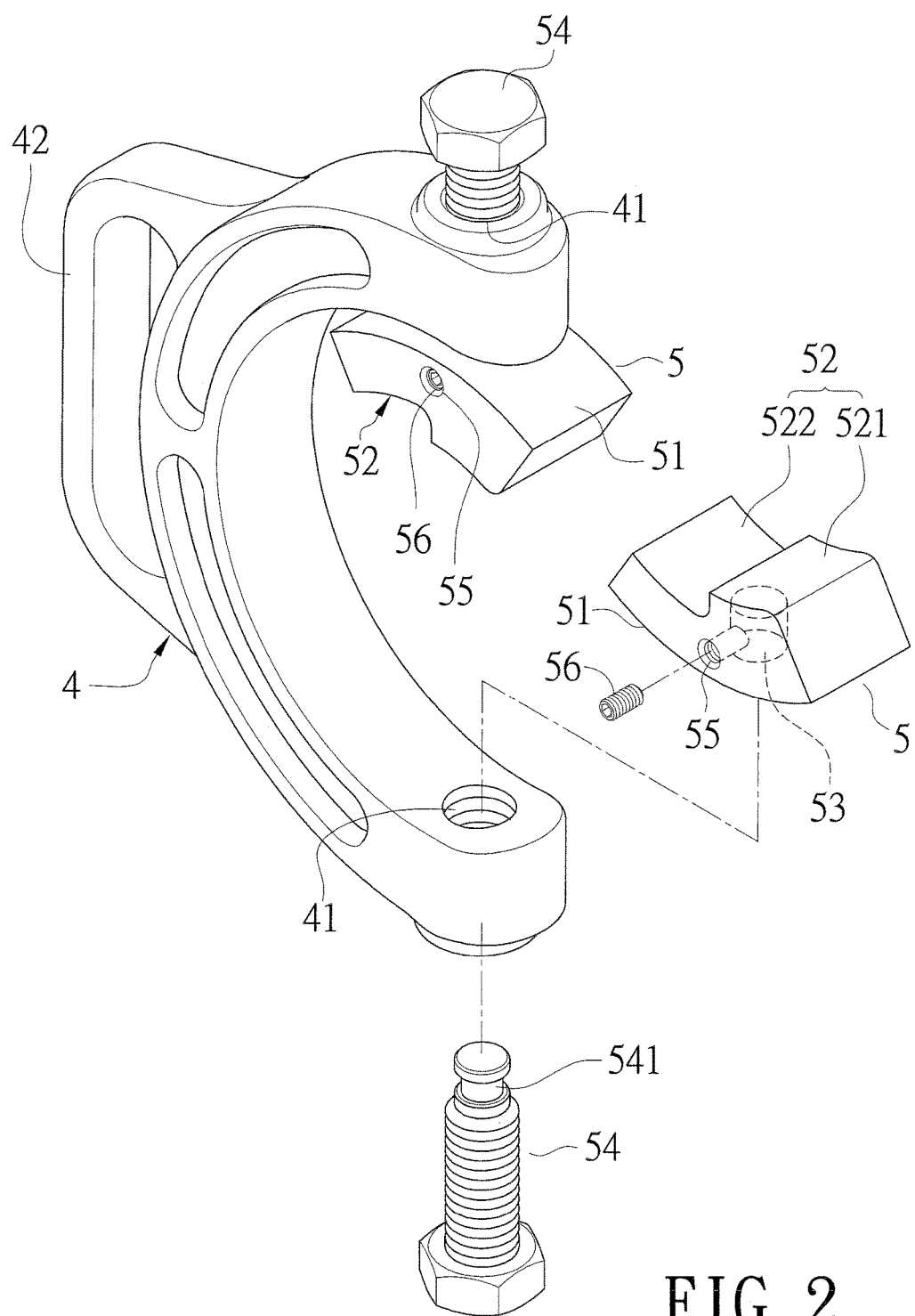
FIG. 2 a stereogram showing a clamping seat and two positioning elements respectively disposed on two ends of the clamping seat according to the present invention.
Figure 3:
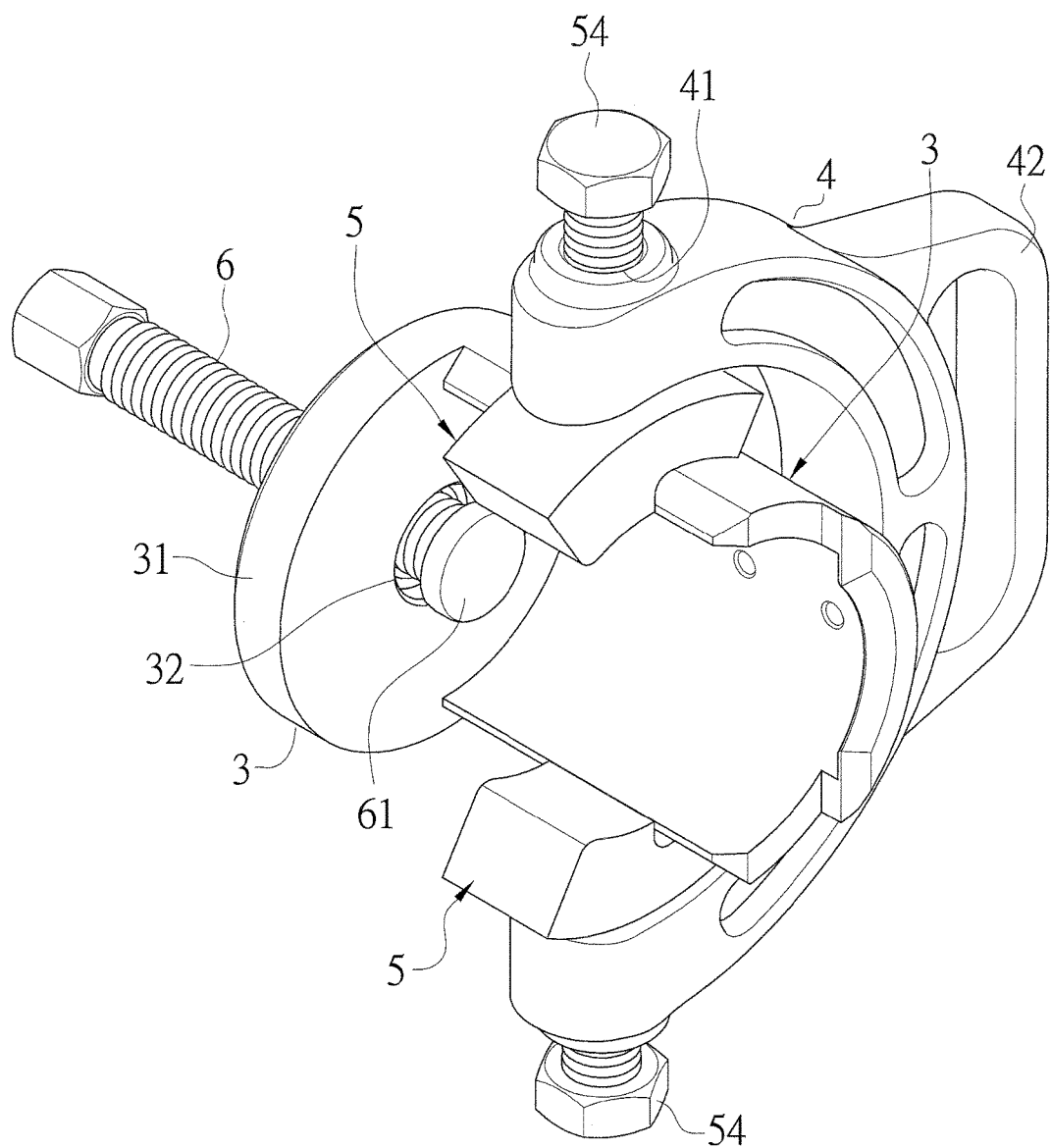
FIG. 3 is a stereogram showing a disassembler for an iron sleeve of a drag arm not yet installed with a top push casing, a first screw and a bolt nut.
Figure 4:
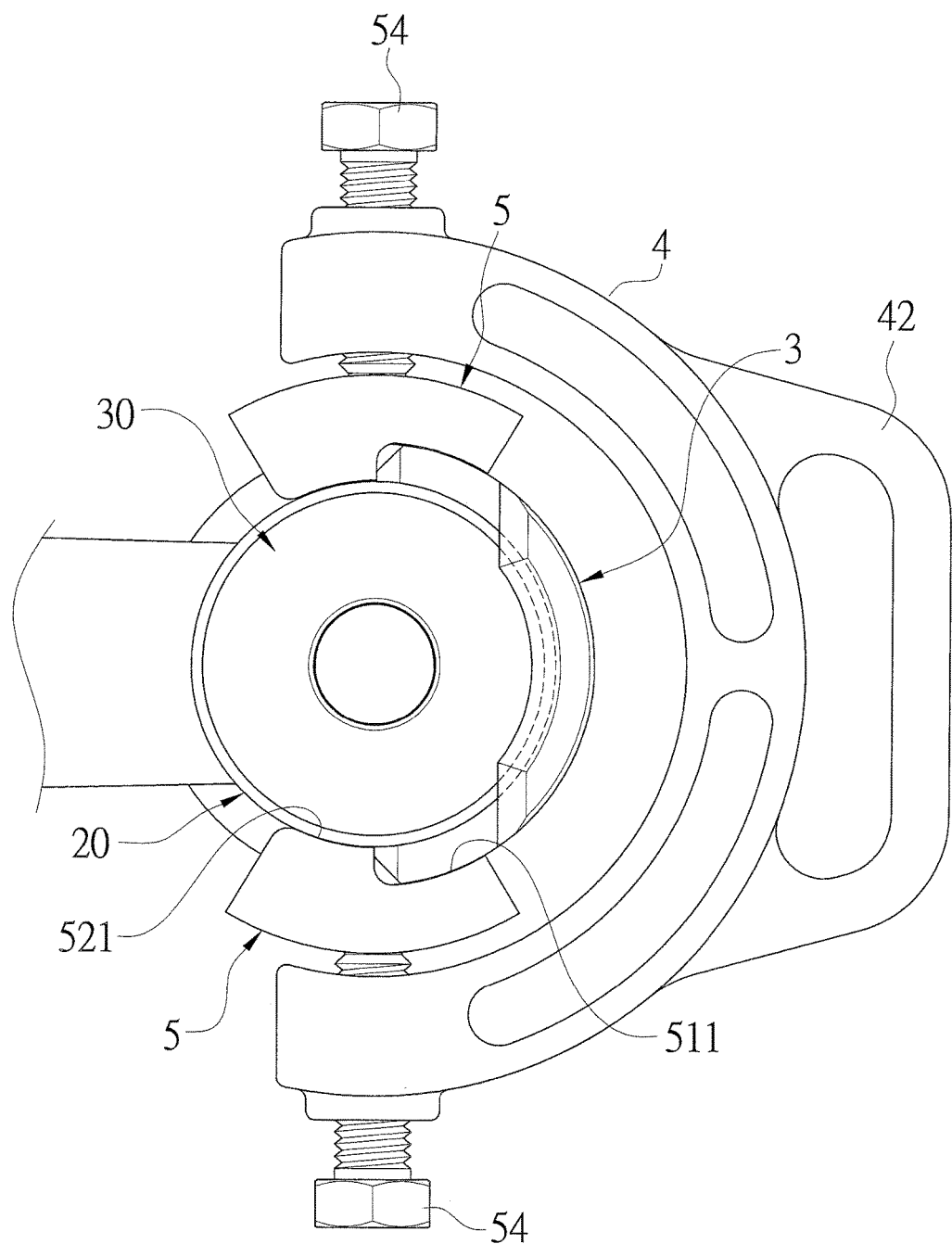
FIG. 4 is a schematic diagram of a first embodiment showing a disassembler for an iron sleeve of a drag arm in disassembling an iron sleeve according to the present invention.
Figure 5:
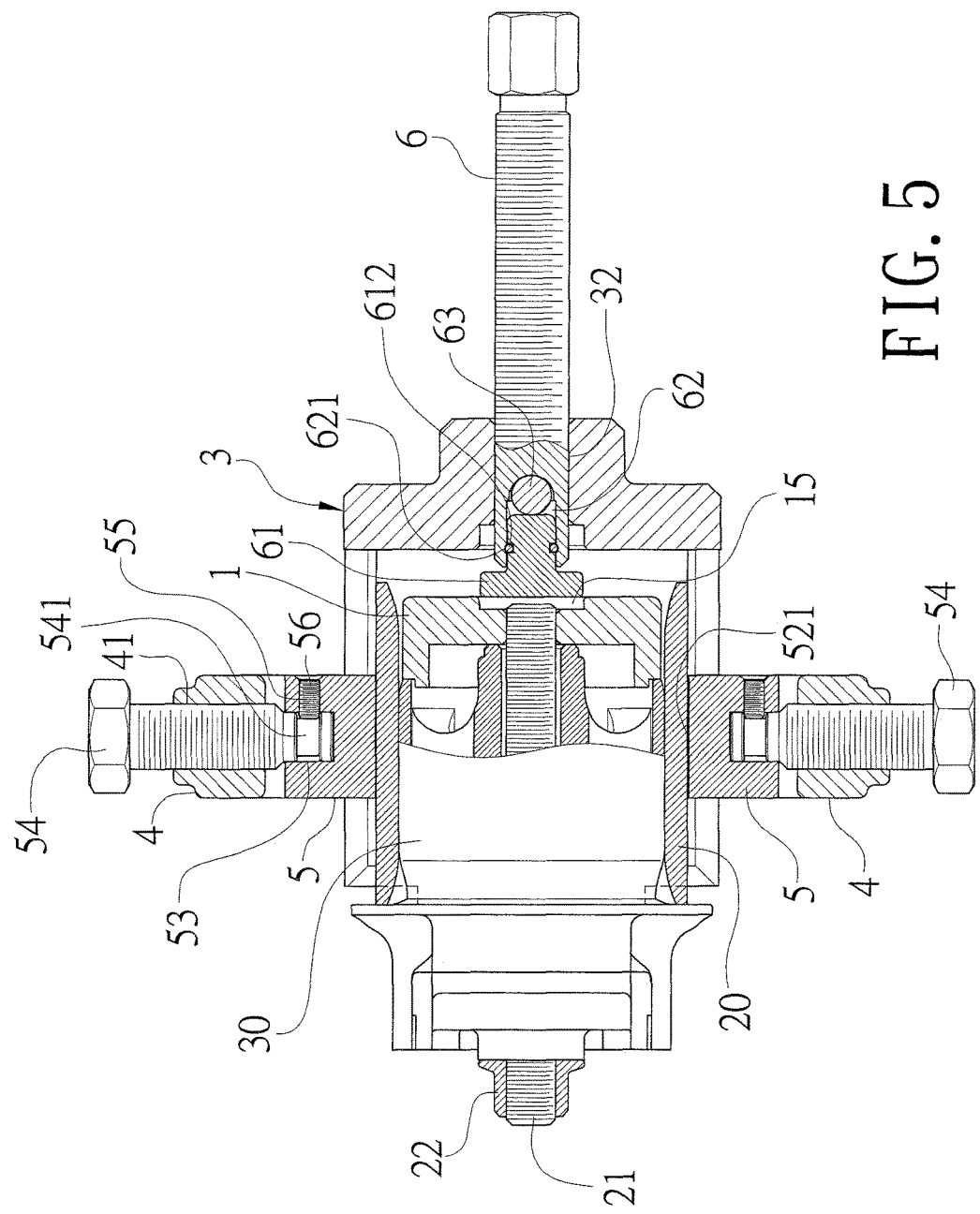
FIG. 5 is a cross-sectional diagram of a first embodiment showing a disassembler for an iron sleeve of a drag arm in disassembling an iron sleeve according to the present invention.
Figure 6:
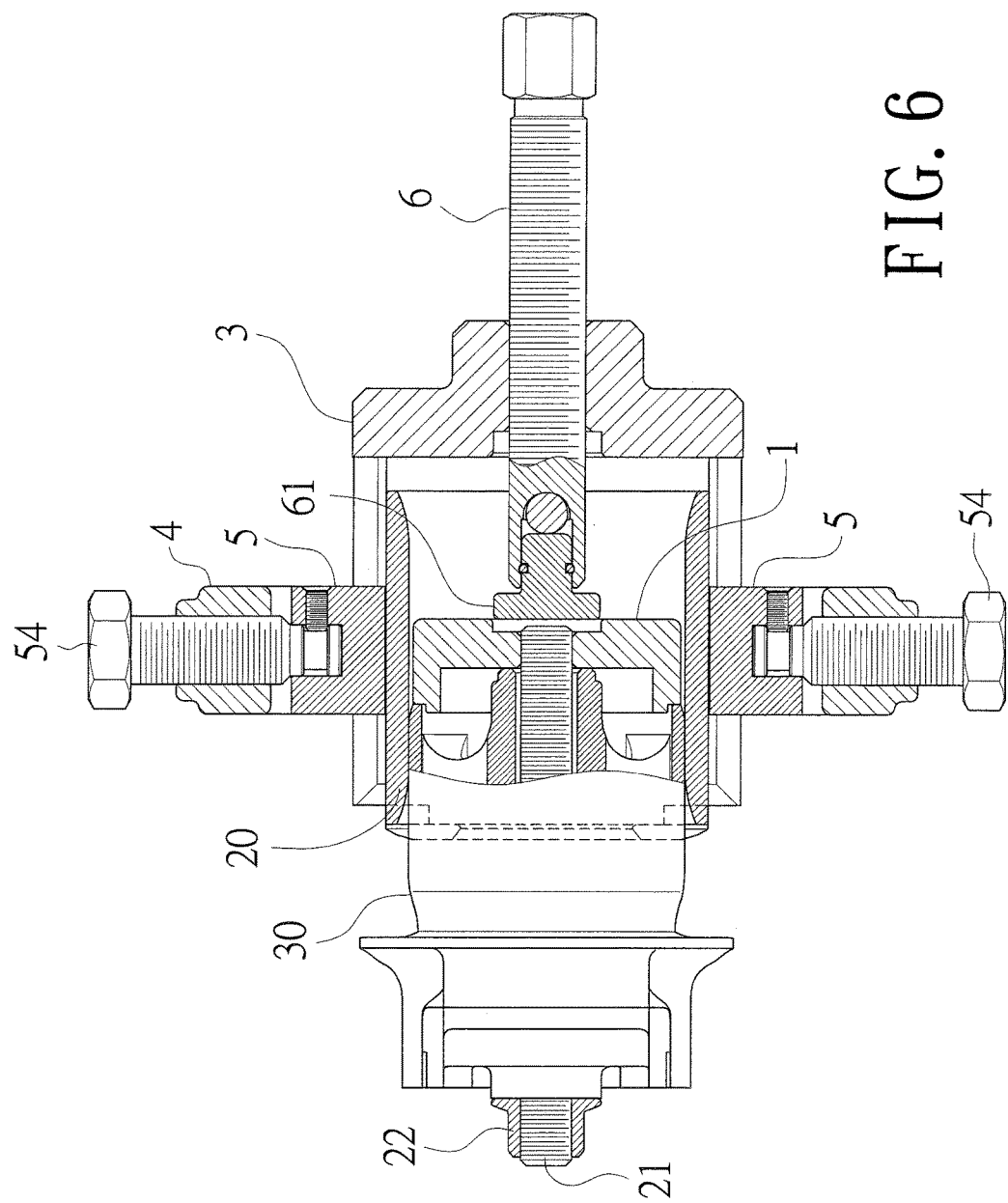
FIG. 6 is a cross-sectional diagram of a second embodiment showing a disassembler for an iron sleeve of a drag arm in disassembling an iron sleeve according to the present invention.
Figure 7:
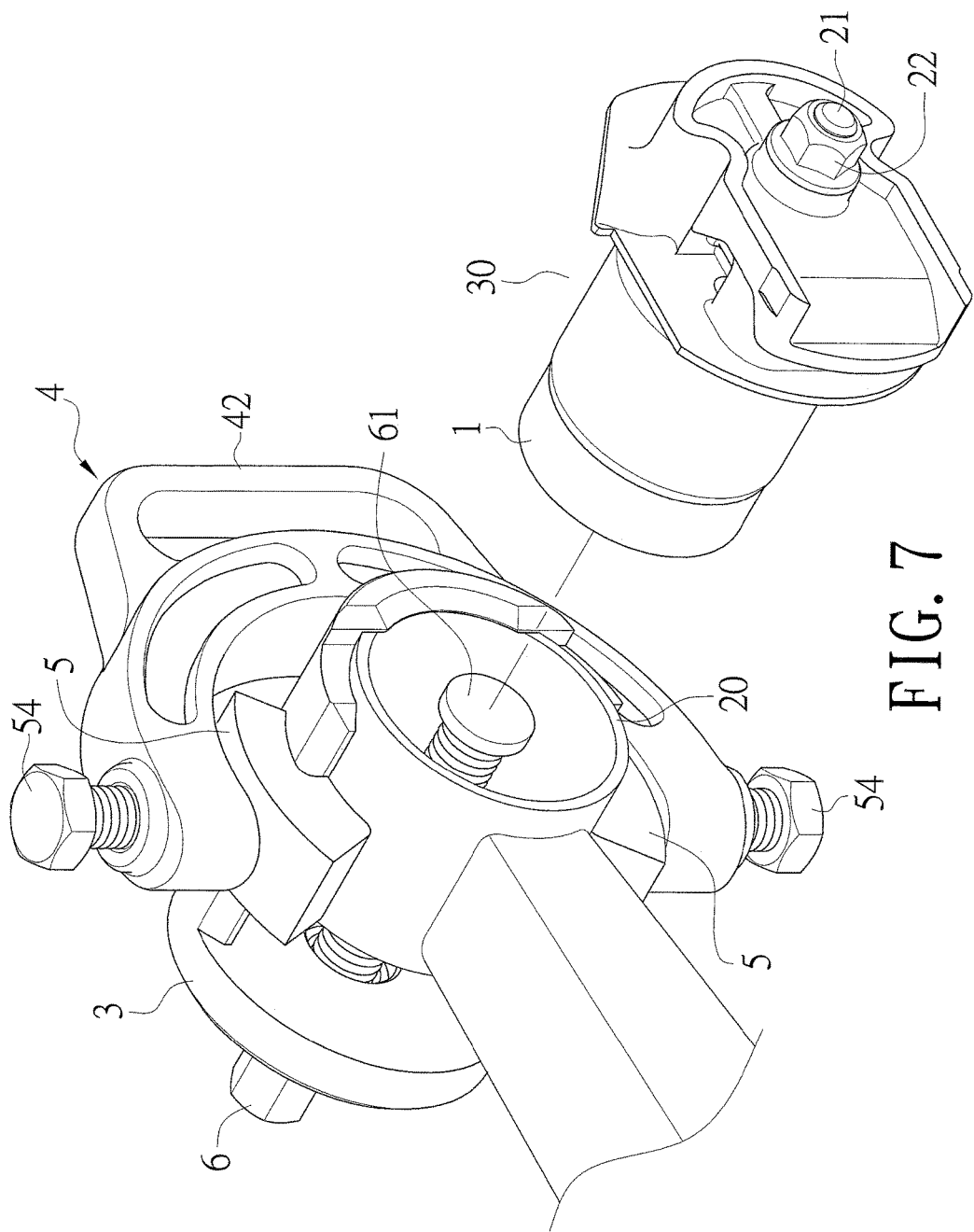
FIG. 7 is a stereogram of a first embodiment showing a disassembler for an iron sleeve of a drag arm completing a detachment of an iron sleeve.
Figure 8:
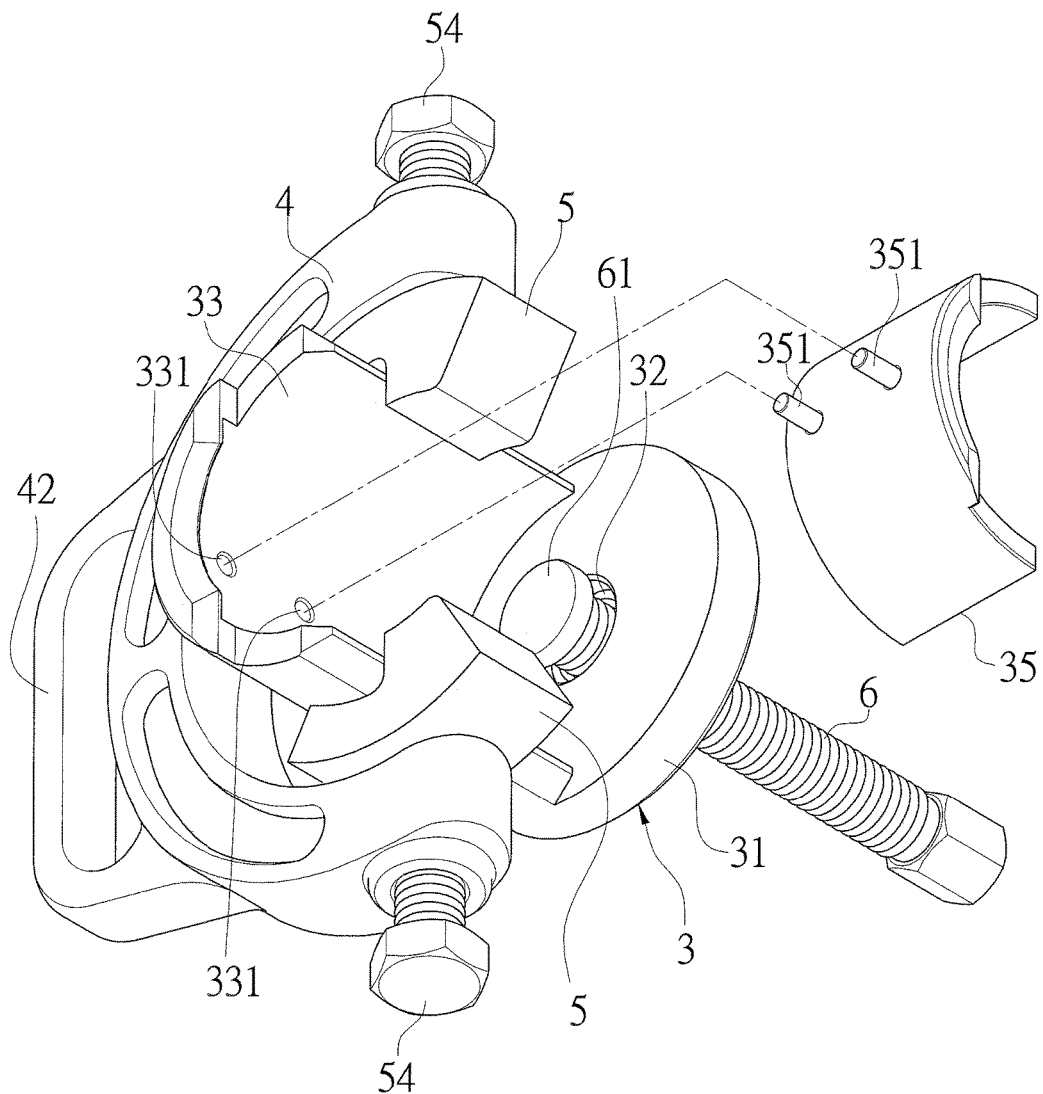
FIG. 8 is stereogram showing a casing, a clamping seat, two positioning elements and a second screw according to the present invention.
Figure 9:
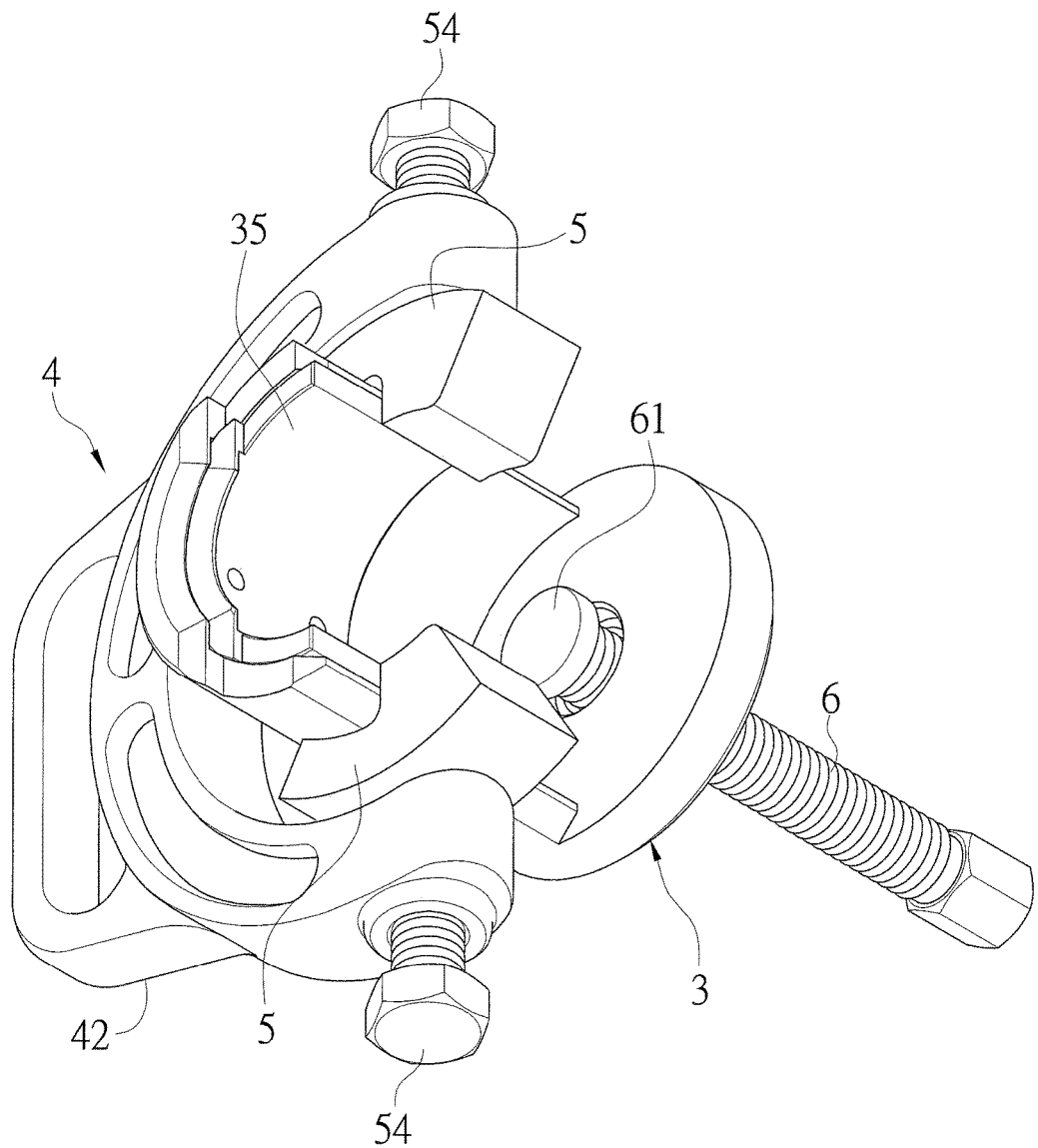
FIG. 9 is a stereogram showing a disassembler for an iron sleeve of a drag arm provided with an arc gasket.
Figure 10:
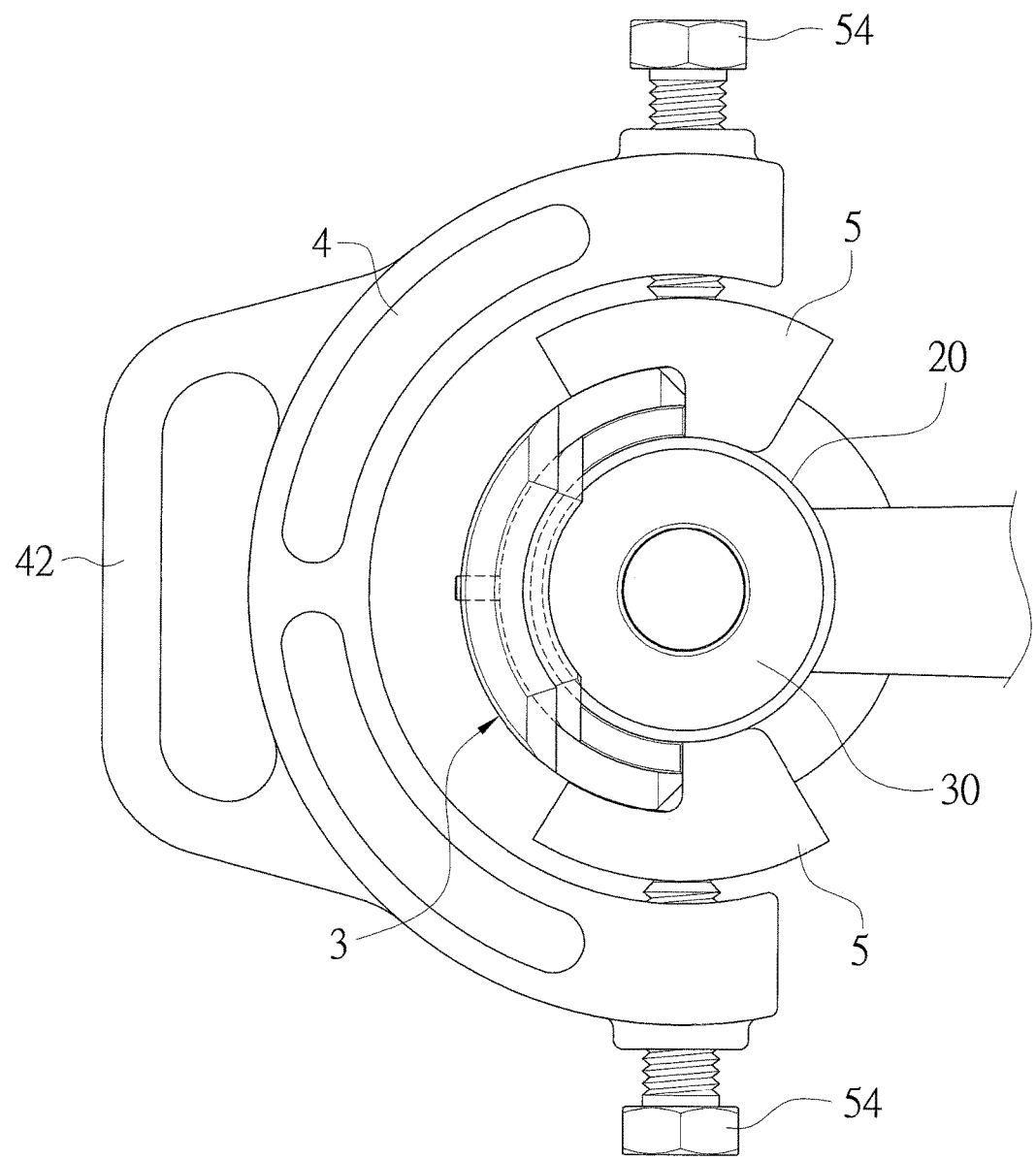
FIG. 10 is a schematic diagram of a second embodiment showing a disassembler for an iron sleeve of a drag arm in disassembling an iron sleeve according to the present invention.
Figure 11:
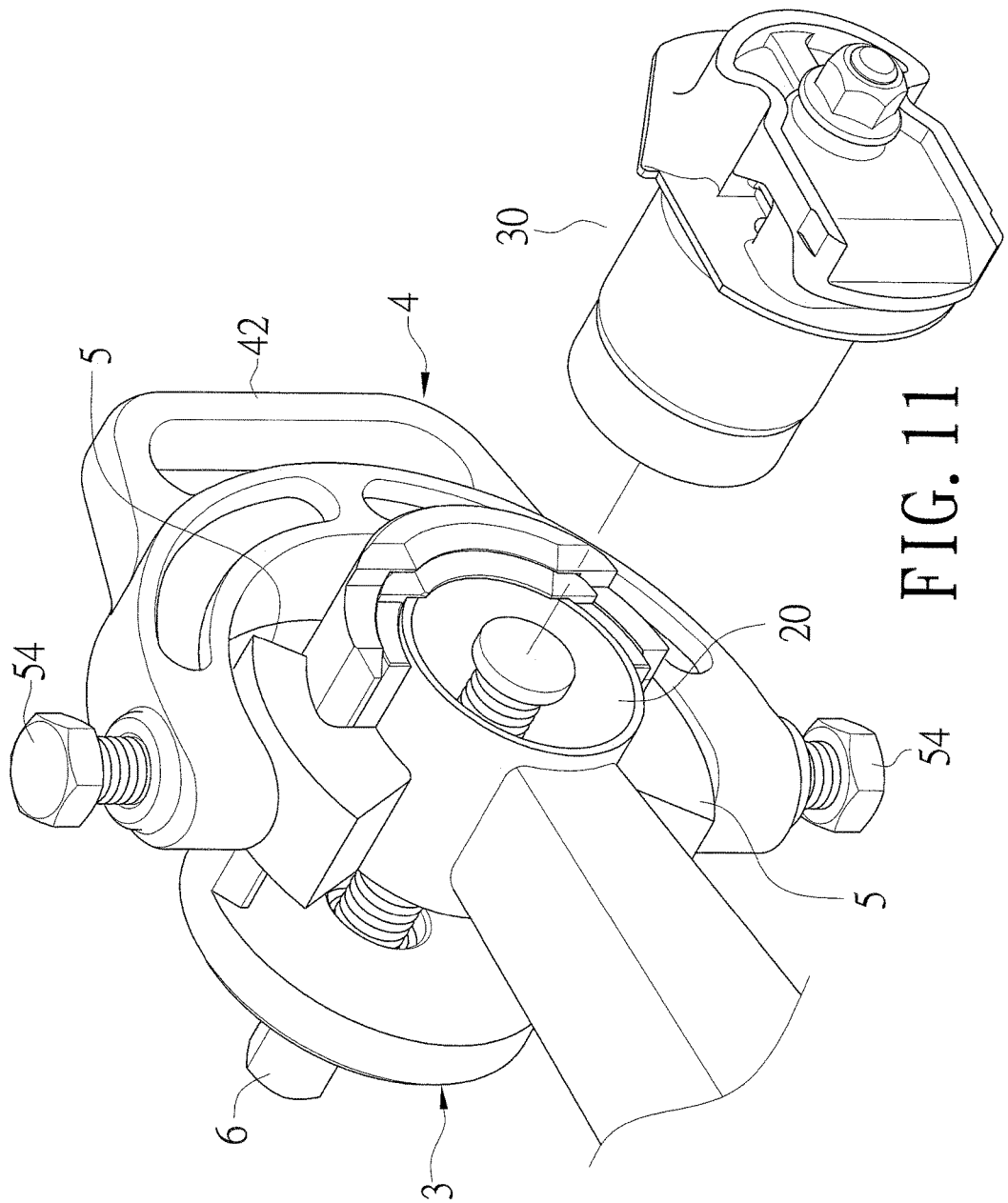
FIG. 11 is a stereogram of a second embodiment showing a disassembler for an iron sleeve of a drag arm completing a detachment of an iron sleeve.

Hereinafter, an exemplary embodiment of the present invention will be described in detail with reference to the accompanying drawings.

As showed in FIGS. 1-4, disassembler for an iron sleeve of a drag arm is disclosed. It comprises a top push casing (1), a first screw (21), a bolt nut (22), a casing (3), a clamping seat (4), two positioning elements (5), and a second screw (6).

The top push casing (1) has a closed end (11), an open end (12) opposite to the closed end (11), and a first threaded hole (13) disposed at the closed end (11). The open end (12) of the top push casing (1) is provided with a rim (14) for jointing the iron sleeve (30) in a bushing (20) of a drag arm.

The first screw (21) has a first end (211) for screwing into the first threaded hole (13) and a second end (212) opposite to the first end (211). The second end (212) of the first screw (21) is inserted into the iron sleeve (30) of a drag arm and further screwed into the bolt nut (22) for positioning the iron sleeve (30) between the top push casing (1) and the bolt nut (22) and making the iron sleeve (30) be clamped by the top push casing (1) and the bolt nut (22).

The casing (3) has a ring surface (31), a second threaded hole (32) disposed on the ring surface (31), an arc wall (33) having one end extended from a partial periphery of the ring surface (31), a flange (34) disposed on the other end of the arc wall (33) for engaging with a junction of the iron sleeve (30) and the bushing (20) of the drag arm.

The clamping seat (4) has two terminals for accommodating the casing (3).

The two positioning elements (5) are two blocks with curvature and respectively disposed on internal surfaces at the two terminals of the clamping seat (4), and each of the two positioning elements (5) has an outer arc surface (51) towards the clamping seat (4) and an inner arc surface (52) towards the bushing (20) and the casing (3). The inner arc surface (52) has a stepped shape comprising a first clamping surface (521) relative to the bushing (20) and a second clamping surface (522) relative to the casing (3) for clamping and positioning the casing (3) on the bushing (20).

The second screw (6) is inserted into the second threaded hole (32) for screwing on the casing (3) and is provided with a push piece (61) for contacting an outer surface of the closed end (11) of the top push casing (1).

Accordingly, when the second screw (6) is rotated, the push piece (61) of the second screw (6) pushes forwards the top push casing (1) to detach the iron sleeve (30) inserted by the first screw (21) and clamped by the top push casing (1) and the bolt nut (22) from the bushing (20) of the drag arm.

In particular, the clamping seat (4) is provided with two first lock holes (41), and the two positioning elements (5) are provided with two positioning apertures (53) on the outer arc surface (51) thereof and two positioning screws (54) for screwing into the two first lock holes (41) of the clamping seat (4). The two positioning screws (54) are respectively screwed into the two first lock holes (41) and further inserted into the two positioning apertures (53) so that the two positioning elements (5) can clamp and position the casing (3) on the bushing (20).

According to the abovementioned description, each of a terminal of the two positioning screws (54) is provided with a concave ring (541), and each of the two positioning elements (5) is provided with a second lock hole (55) and a positioning piece (56) for screwing into the second lock hole (55) and further contacting the concave ring (541) of each of the two positioning screws (54) to position each of the two positioning screws (54) on each of the two positioning elements (5) as a whole which is not easy to be separated.

Moreover, the second screw (6) is provided with a containing groove (62) having a concave ring (621) at a terminal thereof and a ball (63) accommodated in the containing groove (62). The push piece (61) is provided with a joint bar (611) for inserting into the containing groove (62) and contacting the ball (63) at a terminal thereof and a C-ring (612) for engaging with the joint bar (611) inserted into the containing groove (62) and with the concave ring (621) to position the push piece (61) on the second screw (6). The top push casing (1) is provided with a concaved groove (15) for correspondingly receiving the push piece (61). Preferentially, the concaved groove (15) has a same shape as an end face of the push piece (61).

In dissembling the iron sleeve (30) in the bushing (20) as shown in FIGS. 3-7, the first end (211) of the first screw (21) is screwed into the first threaded hole (13) of the top push casing (1) (FIG. 1), and then the second end (212) of the first screw (21) is inserted into the iron sleeve (30) and screwed into the bolt nut (22). In such a case, the rim (14) on the open end (12) of the top push casing (1) is jointed to the iron sleeve (30) so that the iron sleeve (30) is located between the top push casing (1) and the bolt nut (22) and respectively clamped by the top push casing (1) and the bolt nut (22) on both sides thereof. Furthermore, the second screw (6) is inserted into the second threaded hole (32) for screwing on the casing (3), and the casing (3) is disposed on an outside of the bushing (20). The flange (34) disposed on the arc wall (33) of the casing (3) is engaged with a junction of the iron sleeve (30) and the bushing (20) of the drag arm, allowing the arc wall (33) of the casing (3) to partially wrap up the bushing (20). When the casing (3) is accommodated in the clamping seat (4), the first clamping surface (521) and the second clamping surface (522) of the two positioning element (5) respectively contact an outer surface of the bushing (20) and an outer surface of the casing (3). The two positioning screws (54) are respectively screwed into the two first lock holes (41) of the clamping seat (4) for further pushing the two positioning element (5) and allowing the two positioning element (5) to clamp and limit the casing (3) and the bushing (20). Finally, the push piece (61) of the second screw (6) can be pushed forwards an outer surface of the closed end (11) of the top push casing (1) by using a tool to rotate the second screw (6). Accordingly, the casing (3), the two positioning element (5) and the second screw (6) are combined as a whole which keeps the bushing (20) of the drag arm stopped therein. When the second screw (6) is rotated, the push piece (61) moves and pushes forwards the top push casing (1) to detach the iron sleeve (30) from the bushing (20) of the drag arm so as to achieve efficacy of dissembling the iron sleeve (30) from the bushing (20).

According to the above description, the disassembler of the present invention can be used to dissembling the iron sleeve (30) from the bushing (20) easily and can ensure that the structures of the iron sleeve (30) and the bushing (20) are not damaged in a disassembling process. Additionally, a handle (42) is provided on an outer surface of the clamping seat (4) so that a user can grip the disassembler by hand in assembling or disassembling the iron sleeve (30).

Referring to FIGS. 8-11, a second embodiment showing a disassembler for an iron sleeve of a drag arm is disclosed for solving the problem of clamping the iron sleeve (30) and the bushing (20) having different external diameters of various vehicles. By installing an arc gasket (35) on an inner surface the arc wall (33) of the casing (3) or not, and cooperated with the two positioning elements (5) having the first clamping surfaces (521) and the second clamping surfaces (522), the arc gasket (35) can reduce an inner diameter of the arc wall (33) of the casing (3), allowing the bushing (20) having a less external diameter to be clamped by the casing (3). The two positioning elements (5) firmly clamping the casing (3) and the bushing (20) can make sure that the removal of the iron sleeve (30) is carried out smoothly. In the FIG. 8, the arc wall (33) of the casing (3) is provided with at least two perforations (331), and the arc gasket (35) is provided with at least two rods (351) for correspondingly inserting into the at least two perforations (331) to position the arc gasket (35) on the inner surface of the arc wall (33) of the casing (3).

Figure 12:
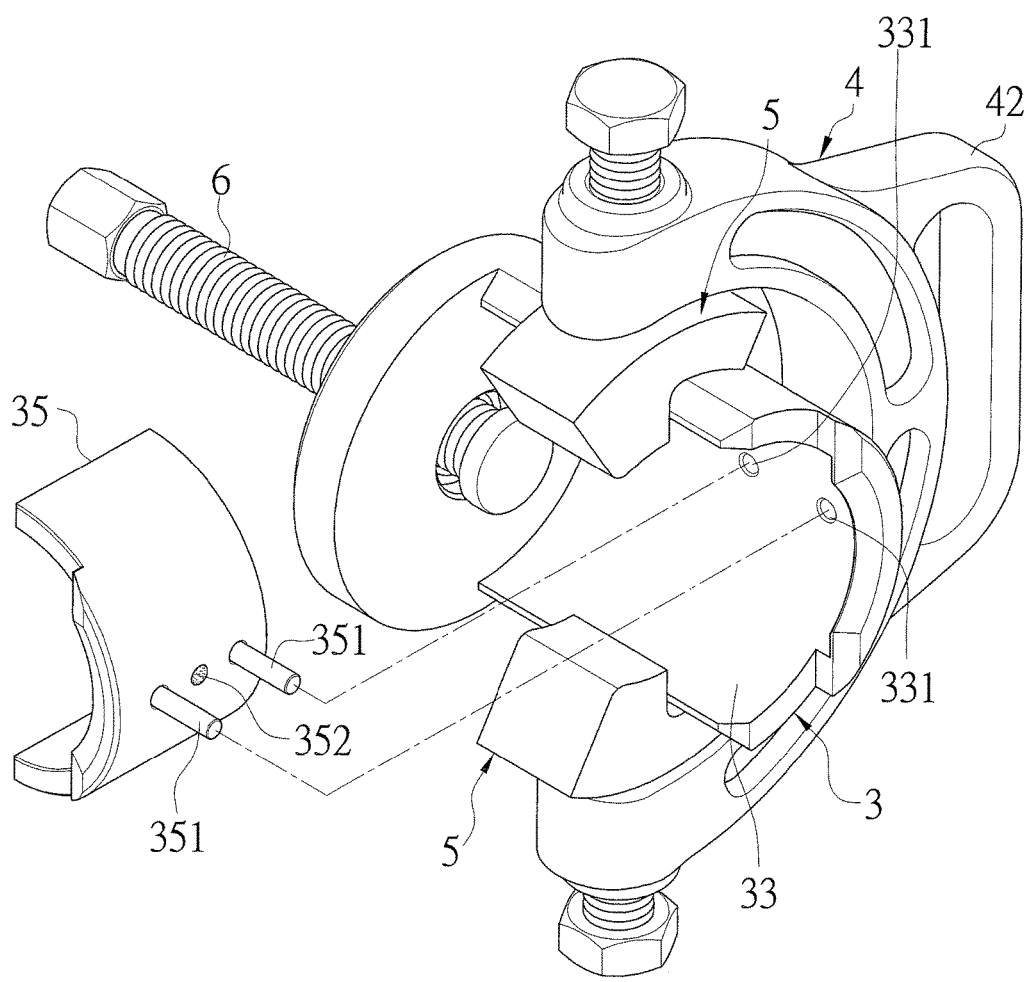
FIG. 12 is a decomposition diagram showing a casing and an arc gasket according to the present invention.
Figure 13:
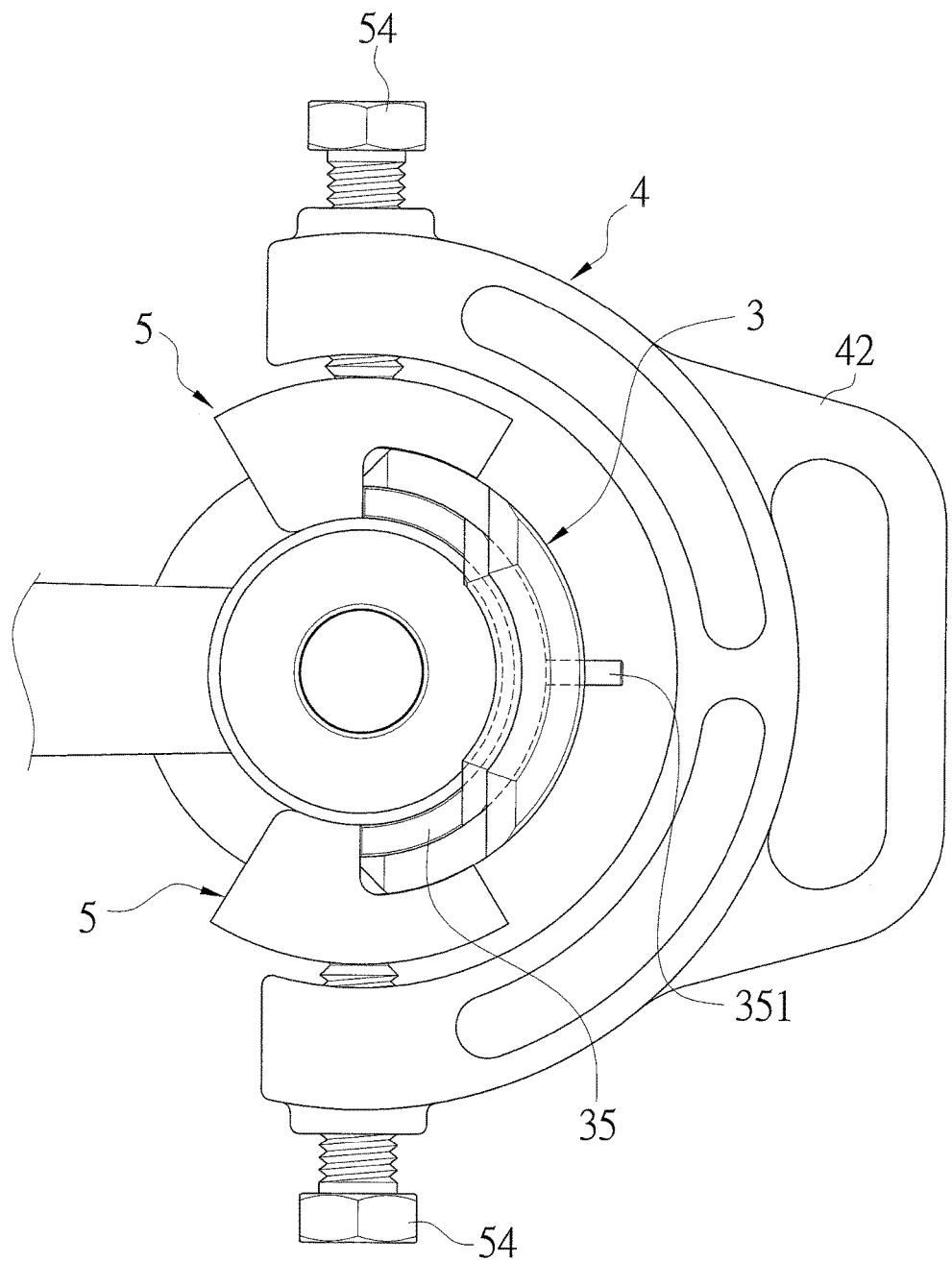
FIG. 13 is a stereogram showing an arc gasket disposed on an inner surface of an arc wall of a casing.
Figure 14:
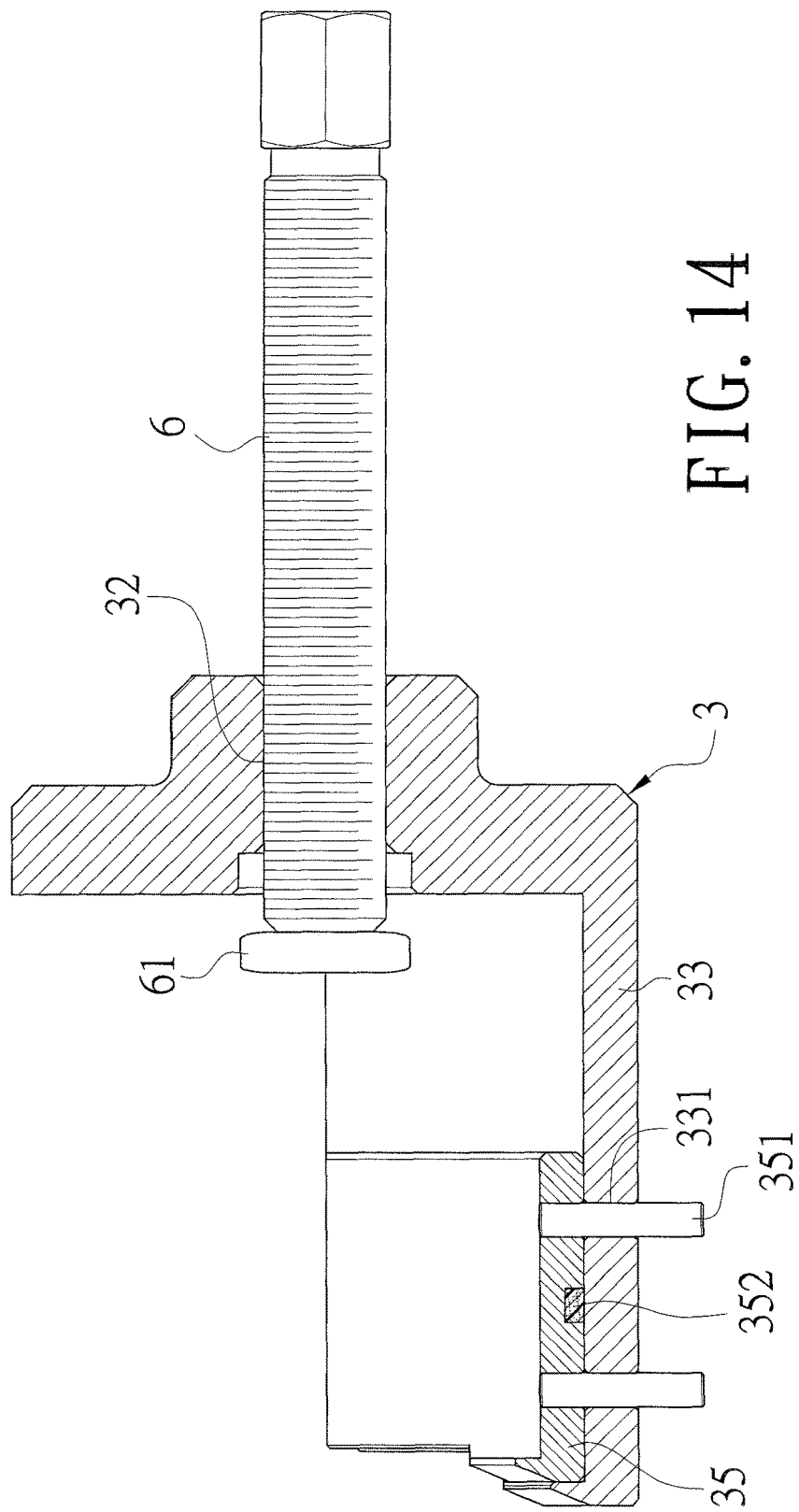
FIG. 14 is a partial cross-sectional diagram showing an arc gasket disposed on an arc wall of a casing.

Referring to FIGS. 12-14, the lengths of the at least two rods (351) are further increased to be larger than the thickness of the arc wall (33) so that the at least two rods (351) can be protruded from an outer surface of the arc wall (33) after the at least two rods (351) are inserted into the at least two perforations (331). In such a case, the arc gasket (35) can be detached from the casing (3) easily by pressing the at least two rods (351) protruded from the outer surface of the arc wall (33) towards the arc wall (33) to form a gap between the arc wall (33) and the arc gasket (35).

In the FIG. 12, the arc gasket (35) is inlaid with a magnetic element (352) and the arc wall (33) of the casing (3) is made of an iron-based material for attracting the magnetic element (352) and increasing the bonding of the arc gasket (35) to the casing (3).

What is claimed is:

1. A disassembler for an iron sleeve of a drag arm, comprising:
    a top push casing having a closed end, an open end opposite to the closed end, and a first threaded hole disposed at the closed end;
    a first screw having a first end for screwing into the first threaded hole and a second end opposite to the first end;
    a bolt nut screwed on the second end of the first screw inserted into an iron sleeve of a drag arm for positioning the iron sleeve between the top push casing and the bolt nut and making the iron sleeve be clamped by the top push casing and the bolt nut;
    a casing having a ring surface, a second threaded hole disposed on the ring surface, an arc wall having one end extended from a partial periphery of the ring surface, a flange disposed on the other end of the arc wall for engaging with a junction of the iron sleeve and a bushing of the drag arm;
    a clamping seat having two terminals for accommodating the casing;
    two positioning elements respectively disposed on the two terminals the clamping seat for clamping and positioning the casing on the bushing, each having an outer arc surface towards the clamping seat and an inner arc surface towards the bushing and the casing, wherein the inner arc surface has a first clamping surface relative to the bushing and a second clamping surface relative to the casing; and
    a second screw inserted into the second threaded hole for screwing on the casing and having a push piece for contacting an outer surface of the closed end of the top push casing, wherein the push piece pushes forwards the top push casing to detach the iron sleeve from the bushing of the drag arm when the second screw is rotated.

2. As the disassembler for an iron sleeve of a drag arm claimed in claim 1, wherein an inner surface the arc wall of the casing is provided with an arc gasket for reducing an inner diameter of the arc wall of the casing.

3. As the disassembler for an iron sleeve of a drag arm claimed in claim 2, wherein the arc wall of the casing is provided with at least two perforations and at least two rods inserted into the at least two perforations for positioning the arc gasket on the inner surface of the arc wall.

4. As the disassembler for an iron sleeve of a drag arm claimed in claim 3, wherein the arc wall is made of an iron-based material, and the arc gasket is inlaid with a magnetic element for attracting the arc wall.

5. As the disassembler for an iron sleeve of a drag arm claimed in claim 4, wherein the clamping seat is provided with a handle on an outer surface thereof.

6. As the disassembler for an iron sleeve of a drag arm claimed in claim 5, wherein the open end of the top push casing is provided with a rim for jointing the iron sleeve.

7. As the disassembler for an iron sleeve of a drag arm claimed in claim 6, wherein the clamping seat is provided with two first lock holes, and the two positioning elements are provided with two positioning apertures on the outer arc surface thereof and two positioning screws for screwing into the two first lock holes and the two positioning apertures.

8. As the disassembler for an iron sleeve of a drag arm claimed in claim 7, wherein each of the two positioning screws is provided with a concave ring at a terminal thereof, and each of the two positioning elements is provided with a second lock hole and a positioning piece for screwing into the second lock hole and further contacting the concave ring to position each of the two positioning screws on each of the two positioning elements.

9. As the disassembler for an iron sleeve of a drag arm claimed in claim 8, wherein the second screw is provided with a containing groove having a concave ring at a terminal thereof and a ball accommodated in the containing groove, and the push piece is provided with a joint bar for inserting into the containing groove and contacting the ball at a terminal thereof and a C-ring for engaging in the containing groove to position the push piece on the second screw.

10. As the disassembler for an iron sleeve of a drag arm claimed in claim 9, wherein the top push casing is provide with a concaved groove for correspondingly receiving the push piece.

11. As the disassembler for an iron sleeve of a drag arm claimed in claim 1, wherein the clamping seat is provided with two first lock holes, and the two positioning elements are provided with two positioning apertures on the outer arc surface thereof and two positioning screws for screwing into the two first lock holes and the two positioning apertures.

12. As the disassembler for an iron sleeve of a drag arm claimed in claim 11, wherein each of the two positioning screws is provided with a concave ring at a terminal thereof, and each of the two positioning elements is provided with a second lock hole and a positioning piece for screwing on the second lock hole and further contacting the concave ring to position each of the two positioning screws on each of the two positioning elements.

13. As the disassembler for an iron sleeve of a drag arm claimed in claim 12, wherein the open end of the top push casing is provided with a rim for jointing the iron sleeve.

14. As the disassembler for an iron sleeve of a drag arm claimed in claim 13, wherein the second screw is provided with a containing groove having a concave ring at a terminal thereof and a ball accommodated in the containing groove, and the push piece is provided with a joint bar for inserting into the containing groove and contacting the ball at a terminal thereof and a C-ring for engaging in the containing groove to position the push piece on the second screw.

15. As the disassembler for an iron sleeve of a drag arm claimed in claim 14, wherein the top push casing is provide with a concaved groove for correspondingly receiving the push piece.

\* \* \* \* \*